(12) United States Patent
Reister et al.

(10) Patent No.: US 7,505,651 B2
(45) Date of Patent: Mar. 17, 2009

(54) OPTICAL PLANAR WAVELENGTH SELECTIVE FILTER AND METHOD OF MANUFACTURE

(75) Inventors: Marcus Reister, Graz (DE); Siegfried Pongratz, Bavaria (DE); Andreas Schaller, Hessen (DE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/539,358

(22) Filed: Oct. 6, 2006

(65) Prior Publication Data

US 2008/0085081 A1    Apr. 10, 2008

(51) Int. Cl.
  G02B 6/34    (2006.01)
  G02B 6/26    (2006.01)
  G02B 6/42    (2006.01)
  G02B 6/10    (2006.01)

(52) U.S. Cl. .............................. 385/37; 385/31; 385/39; 385/46; 385/47; 385/50; 385/129; 385/130; 385/131

(58) Field of Classification Search ..................... 385/37
See application file for complete search history.

(56) References Cited

U.S. PATENT DOCUMENTS

| 5,351,262 | A |   | 9/1994 | Poguntke et al. |
| 5,369,722 | A | * | 11/1994 | Heming et al. ............... 385/130 |
| 5,650,474 | A |   | 7/1997 | Yamaya et al. |
| 6,141,475 | A |   | 10/2000 | Lawrence et al. |
| 6,496,637 | B2 |   | 12/2002 | Blomquist et al. |
| 7,068,885 | B2 |   | 6/2006 | Bidnyk et al. |
| 2004/0151429 | A1 | * | 8/2004 | Janz et al. ..................... 385/27 |
| 2005/0213888 | A1 | * | 9/2005 | Bidnyk et al. ................. 385/47 |

OTHER PUBLICATIONS

Robertsson et al, "New Patternable Dielectric and Optical Materials for MCM-L/D- and o/e-MCM- packaging", Oct. 1997,☐☐The First IEEE International Symposium on Polymeric Electronics Packaging, pp. 203-212.*
Geert Van Steenberge, et al., "Laser Ablated Coupling Structures For Optical Printed Circuit Boards," AT&S AG, Austria, pp. 1-7.
Buestrich, et al., "Sol-Gel Gateway—Ormocers for Integrated Optical Circuits," Fraunhofer-Institut and Robert Bosch GmbH, Aug. 2, 2006, pp. 1-5.
Buestrich, et al., "Ormocer's for Optical Interconnection Technology," Journel of Sol-Gel Science and Technology 20, 181-186, 2001.

* cited by examiner

*Primary Examiner*—Frank G Font
*Assistant Examiner*—Ryan Lepisto
(74) *Attorney, Agent, or Firm*—Leveque Intellectual Property Law, P.C.

(57) ABSTRACT

An optical planar wavelength selective filter is formed on a printed circuit substrate. Low optical loss polymers are used to make a layered structure that contains waveguides and free travel zones. A diffraction grating is strategically placed on the printed circuit substrate so that light from one waveguide is diffracted by the grating to exit the free travel zone and pass through the other waveguides. The low optical loss polymer is a reaction product of the hydrolysis and polycondensation reaction of organically functionalized alkoxysilanes. With a proper grating, the apparatus can be used as an optical triplexer at frequencies of 1310, 1490, and 1550 nanometers.

7 Claims, 3 Drawing Sheets

OPTICAL PLANAR WAVELENGTH SELECTIVE FILTER AND METHOD OF MANUFACTURE

FIELD OF THE INVENTION

This invention relates generally to a digital optical switching device. More particularly, this invention relates to an optical wavelength selective filter for use in data communications.

BACKGROUND

Optical data transmission is becoming a mainstream technology for metro network services. While the technology is still expensive, it is attractive for systems close to the consumer. While the problems of optical data connections on printed circuit boards (PCB) have been noted in the prior art, the cost effective manufacturing of coupling structures for guiding light into optical waveguides has still not been solved in a way that would enable optical PCBs to reach a state of broad implementation. The redirection of light takes a central role in the optical interconnect solution. Some methods of guiding light are used in optical chip-to-chip data transmission, while others provide interconnections based on ferrule design. Still others include embedded fibers bent to redirect light perpendicular to the surface, and the periscope approach, where chips carry the active devices and guide light directly into and out of the embedded optical waveguide. However, a method of low-cost manufacturing of the interconnection that is compatible with traditional PCB production remains lacking.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention. Some features of the drawings are not shown to scale in order to more accurately envision the invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

An optical planar wavelength selective filter is formed on a printed circuit substrate. Low optical loss polymers are used to make a layered structure that contains waveguides and a free travel zone. A diffraction grating is strategically placed on the printed circuit substrate so that light from one waveguide is diffracted by the grating to exit the free travel zone and pass through the other waveguides. The low optical loss polymer is a reaction product of the hydrolysis and polycondensation reaction of organically functionalized alkoxysilanes. With a proper grating, the apparatus can be used as a digital optical triplexer at frequencies of 1310, 1490, and 1550 nanometers.

Figure 1:
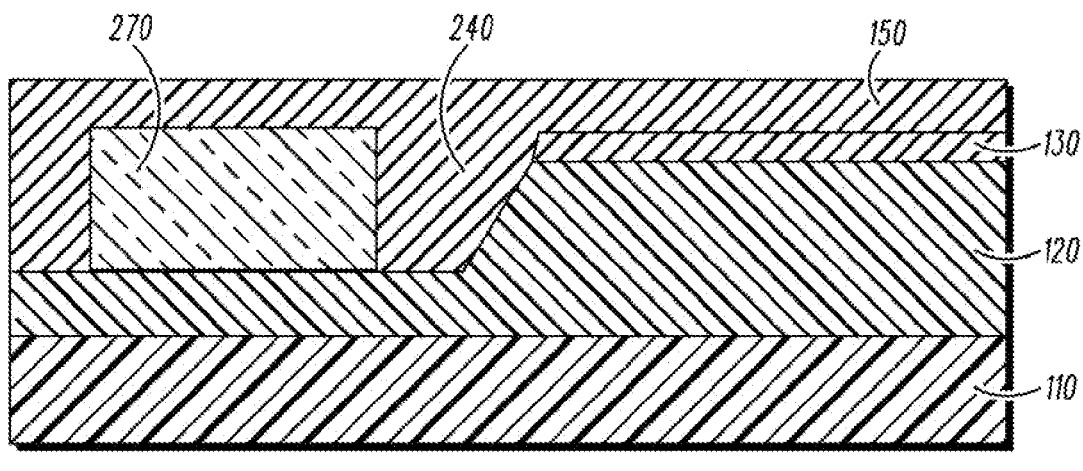
FIG. 1 is a cross-sectional view through section 1-1 of FIG. 2, of an optical planar wavelength selective filter in accordance with certain embodiments of the present invention.
Figure 2:
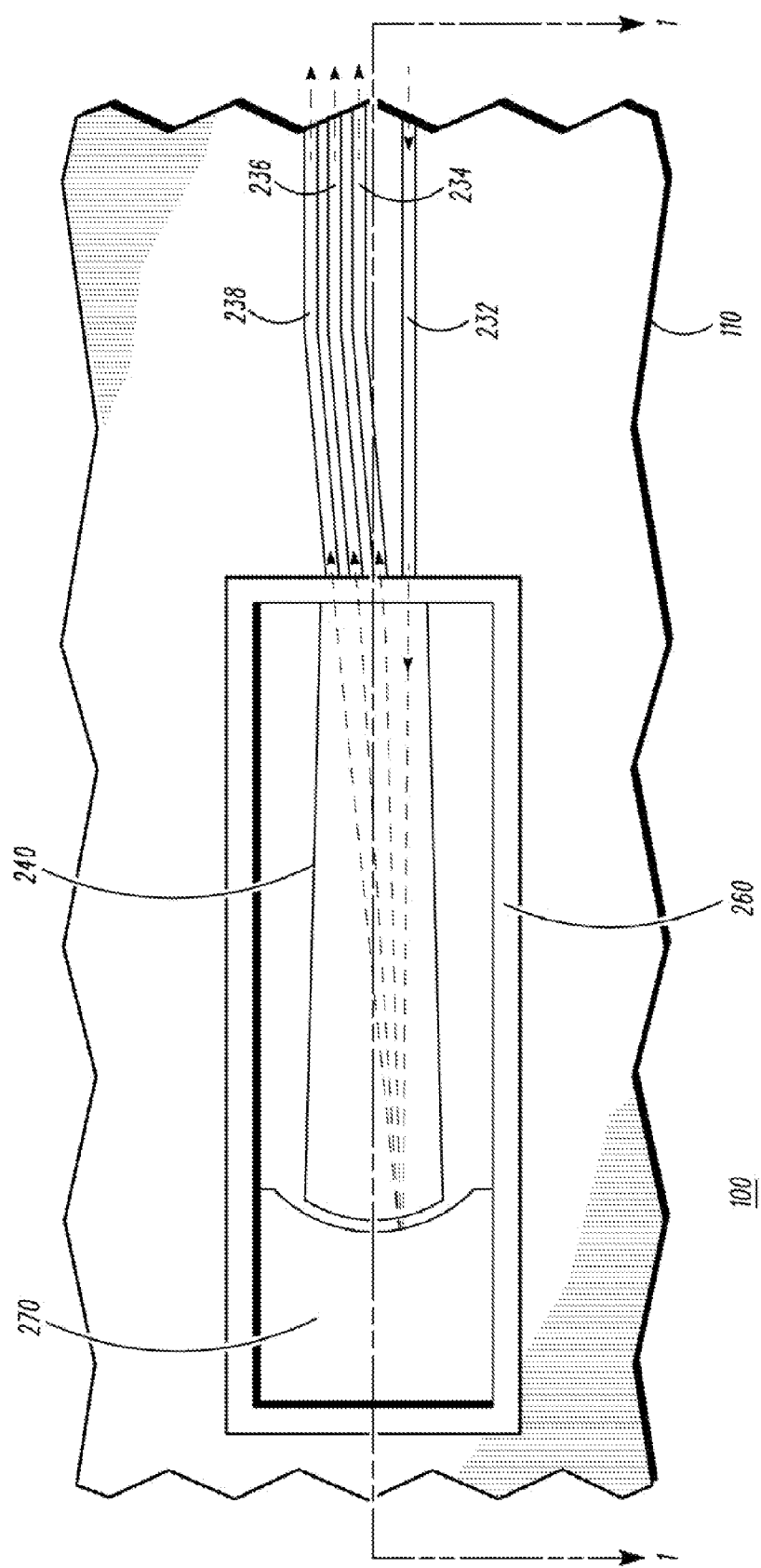
FIG. 2 is a plan view of the optical planar wavelength selective filter, in accordance with certain embodiments of the present invention.

Referring now to FIGS. 1 and 2, an optical planar wavelength selective filter 100 is formed on a substrate 110 such as a printed circuit board (PCB), for example the well known laminated epoxy-glass construction commonly referred to as FR-4, or other type of substrate such as polyimide-glass, etc. The substrate, while serving as the base for the optical planar wavelength selective filter, may also contain other structure, such as plated through holes, vias, circuit traces, solder resist, solder, and components such as resistors, capacitors, chip carriers, etc. On one side of the PCB 110, a low optical loss polymer is deposited to form an adherent layer, referred to as a buffer layer 120. This polymer should exhibit low optical losses in the near infrared range, especially at the wavelengths that are used in optical communications (1310 nanometer, 1490 nanometer, and 1550 nanometer). It should also exhibit good optical and dielectric properties as well as good thermal stability (decomposition above 270° Centigrade). Preferably, it should also be photopatternable, that is, amenable to creation of three dimensional features by means of photolithography. Some examples of suitable polymers are acrylates, siloxanes, polyimides, polycarbonates, hybrid inorganic-organic polymers, and olefins. One low optical loss polymer that we find particularly suitable is a reaction product of the hydrolysis and polycondensation reaction of organically functionalized alkoxysilanes, know by the trade name of ORMOCER®, developed by the Fraunhofer-Institut für Silicatforschung ISC, Würzburg, Germany, and sold by Micro Resist Technology GMBH, Berlin, Germany. The refractive index of this class of materials is easily tunable by mixing with an appropriate resin of different refractive index, and the viscosity can be easily adjusted for various application techniques. The coating or deposition of the adherent layer itself can be performed by means of typical processing methods such as spin-on techniques, dip-coating or curtain-coating. Due to the presence of organically cross linkable functionalities (methacrylic substituent), the resulting coatings show negative resist behavior, which makes them photoimageable upon exposure to UV irradiation, referred to as the second step in ORMOCER® synthesis. Negative resist in this context means that the exposed area is hardened and the resin covered with the mask can be washed away with a suitable solvent mixture.

The next step in the formation of the optical planar wavelength selective filter is the formation of the waveguide core layer 130. The waveguide core layer 130 is also a low optical loss polymer, preferably a polymer of the same general classification as the buffer layer 120, but it should have a refractive index that is higher than the refractive index of the buffer layer. One low optical loss polymer that we find particularly suitable as a waveguide core layer is ORMOCER®. Three or more waveguide channels 232, 234, 236, 238 are then formed in the waveguide core layer 130 by means of photolithography. A free travel zone 240 is also formed in the waveguide core layer 130 by means of photolithography. The free travel zone and the waveguide channels are situated with respect to each other such that one end of each of the waveguides is coupled to the free travel zone. The free travel zone is suitably sized to facilitate the proper transmission of the propagated light.

After formation of the waveguides and the free travel zone, a cladding layer 150 consisting of another low optical loss polymer is deposited on the waveguide core layer 130 and in the cavity defined by the free travel zone 240. This low optical loss polymer should have a refractive index that is lower than the refractive index of the waveguide core layer, and in one embodiment, the same material that was selected for the buffer layer 120 can be used for the cladding layer, although the latter is not a requirement. By employing a core layer that exhibits a higher refractive index than the buffer layer and the cladding layer, optical signals that travel down the waveguide channels are contained therein.

A cavity 260 is then formed in the cladding layer to receive a diffraction grating 270. The cavity 260 is preferably formed by using an ablative laser to create a smooth walled and well defined cavity. Optionally, the cavity may also extend downward into the buffer layer, all the way to the PCB if necessary. The diffraction grating 270 is then situated in the cavity in such an orientation that when light signals arriving from one of the waveguide channels pass through the free travel zone and reach the grating, they are diffracted to return through the free travel zone and enter one or more of the other waveguides. By appropriate selection and orientation of the diffraction grating, a triplexer can be formed that will select and emit signals at frequencies of 1310, 1490, and 1550 nanometers.

Figure 3:
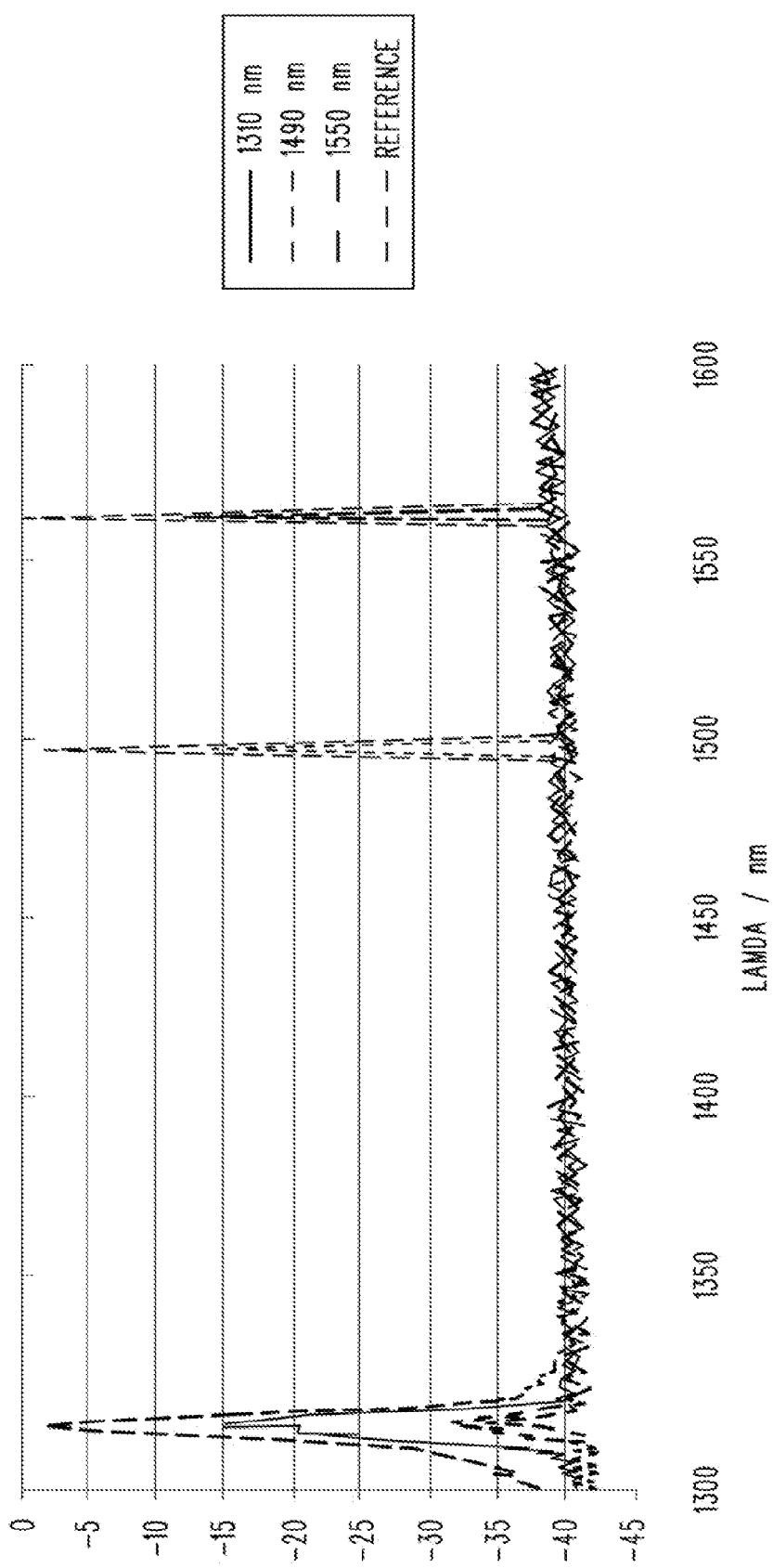
FIG. 3 is a graph depicting the response of an exemplary optical planar wavelength selective filter in accordance with certain embodiments of the present invention.

Having now described the various elements in our optical planar wavelength selective filter, a specific example of a triplexer made for frequencies of 1310, 1490, and 1550 nanometers will be enumerated. An FR-4 PCB was used as the base substrate, with the buffer layer, waveguide core layer, and cladding layer all comprising ORMOCER®. The ORMOCER® layers were deposited using spin coating, and the waveguides and free travel zone were photodefined. The free travel zone was approximately 2.1 millimeters wide, 8.2 millimeters long and 80 microns deep. A cavity for the diffraction grating was formed using an ablative laser, and was approximately 5 mm on each side. Four waveguides were arranged so that one end of each of the waveguide channels adjoined the free travel zone, and the opposite ends of the waveguide channels were splayed apart. One waveguide channel was used as the input, and the other three served as outputs. FIG. 3 shows that strong, clean signals were produced at the three outputs.

In summary, without intending to limit the scope of the invention, an optical wavelength selective filter for use in the infrared region is formed on a printed circuit substrate. The device consists of an embedded optical waveguide, using three ORMOCER® layers, buffer (lower refractive index), core (higher refractive index), and cladding (lower refractive index). A diffraction grating is strategically placed on the printed circuit substrate so that light from one embedded optical waveguide is diffracted by the grating to exit the free travel zone and pass through the other waveguides. Those skilled in the art will recognize that the present invention has been described in terms of exemplary embodiments based upon use of low optical loss polymer that is a reaction product of the hydrolysis and polycondensation reaction of organically functionalized alkoxysilanes. However, the invention should not be so limited, since other variations will occur to those skilled in the art upon consideration of the teachings herein.

While the invention has been described in conjunction with specific embodiments, it is evident that many alternatives, modifications, permutations and variations will become apparent to those of ordinary skill in the art in light of the foregoing description. For example, although the drawing figures depict four waveguides, other configurations of three, five, or even more waveguides could be employed, or wavelengths other than those mentioned could be chosen by appropriate selection of the diffraction grating. Accordingly, it is intended that the present invention embrace all such alternatives, modifications and variations as fall within the scope of the appended claims.

What is claimed is:

1. An optical planar wavelength selective filter, comprising:
    a printed circuit substrate;
    a buffer layer comprising a first low optical loss polymer, disposed on a major surface of the printed circuit substrate;
    a waveguide layer comprising a second low optical loss polymer, disposed on the buffer layer;
    a cavity formed in the waveguide layer;
    three or more waveguides formed in the waveguide layer, one end of each of the waveguides coupled to a first end of the cavity;
    an upper cladding layer comprising a third low optical loss polymer, disposed on the waveguide layer and in a portion of the cavity; and
    a diffraction grating situated at a second opposing end of the cavity, such that light entering the cavity via one waveguide is diffracted by the diffraction grating sufficient to exit the cavity and travel through one or more other waveguides.

2. The apparatus as described in claim 1, wherein the low optical loss polymers are selected from the group consisting of acrylates, siloxanes, polyimides, polycarbonates, hybrid inorganic-organic polymers, and olefins.

3. The apparatus as described in claim 2, wherein the low optical loss polymers comprise a polymer that is a reaction product of the hydrolysis and polycondensation reaction of organically functionalized alkoxysilanes.

4. The apparatus as described in claim 1, wherein the first and third low loss optical polymers have similar refractive indices.

5. The apparatus as described in claim 1, wherein the planar wavelength selective filter is a triplexer for frequencies of 1310, 1490, and 1550 nanometers.

6. The apparatus as described in claim 1, wherein the cavity is also formed in the upper cladding layer.

7. The apparatus as described in claim 1, wherein the refractive index of the second low loss optical polymer is greater than the refractive index of the first and third low loss optical polymers.

* * * * *